United States Patent [19]
Dohrendorf

[11] 4,084,294
[45] Apr. 18, 1978

[54] FISH PROCESSING MACHINE

[75] Inventor: Franz Dohrendorf, Lubeck, Germany

[73] Assignee: Nordischer Maschinenbau Rud. Baader, Lubeck, Germany

[21] Appl. No.: 714,337

[22] Filed: Aug. 13, 1976

[51] Int. Cl.² .................... A22C 25/08; A22C 25/12
[52] U.S. Cl. ........................................ 17/57; 17/24; 17/63
[58] Field of Search ................. 17/54, 56, 57, 63, 24, 17/52, 61; 198/406, 408, 424, 796

[56] References Cited

U.S. PATENT DOCUMENTS

| | | | |
|---|---|---|---|
| 975,181 | 11/1910 | Turnbull | 198/796 |
| 1,639,061 | 8/1927 | Schiff | 198/424 |
| 2,210,234 | 8/1940 | Durand | 17/57 |
| 2,245,329 | 6/1941 | Danielsson | 17/52 |
| 2,771,633 | 11/1956 | Bartels et al. | 17/57 |
| 2,822,569 | 2/1958 | Gradoff et al. | 17/56 |
| 3,303,526 | 2/1967 | La Pine et al. | 17/57 |
| 3,309,730 | 3/1967 | Michael | 17/56 |
| 3,469,278 | 9/1969 | Oates | 17/63 |
| 3,525,120 | 8/1970 | Jobmann | 17/57 |
| 3,618,745 | 11/1971 | Dominici | 198/365 |
| 3,805,328 | 4/1974 | Strandine et al. | 17/11 |
| 3,952,371 | 4/1976 | La Pine et al. | 17/52 |
| 3,955,242 | 5/1976 | Hartmann | 17/57 |
| 4,004,681 | 1/1977 | Clewett et al. | 198/365 |

Primary Examiner—Russell R. Kinsey
Assistant Examiner—Paul J. Hirsch
Attorney, Agent, or Firm—Edward F. Levy

[57] ABSTRACT

In a fish processing machine comprising an endless loading conveyor adapted to convey fish lying on their sides in fish troughs transversely to their longitudinal axis, a feed section having opposed walls forming a V-shape and adapted to advance the fish, and a filleting section provided with belly filleting knives, rib knives and a pair of endless conveyors, the feed section is positioned between the upper and lower runs of the loading conveyor, each fish trough has a tipping trough being associated with means to tilt it upon reaching the feed section about an axis substantially transverse to its direction of movement thus delivering fish turned through 90° to the feed section, said opposed V-shape walls comprise synchronously rotating parallel endless conveyor belts passing around two drive rollers at the upstream end and two idler rollers at the downstream end, said idler rollers yielding laterally together with the conveyor belts against restoring spring-force and the conveyor belt also yielding downwardly against restoring spring-force, and a back guide connected to a pair of rocking levers, which are carried by the idler rollers, is pivotally mounted about a horizontal spindle and extends between the idler rollers said connection being such that the space between the conveyor belts corresponding to the width of the fish passing through is set automatically with respect to the corresponding height of the fish.

9 Claims, 5 Drawing Figures

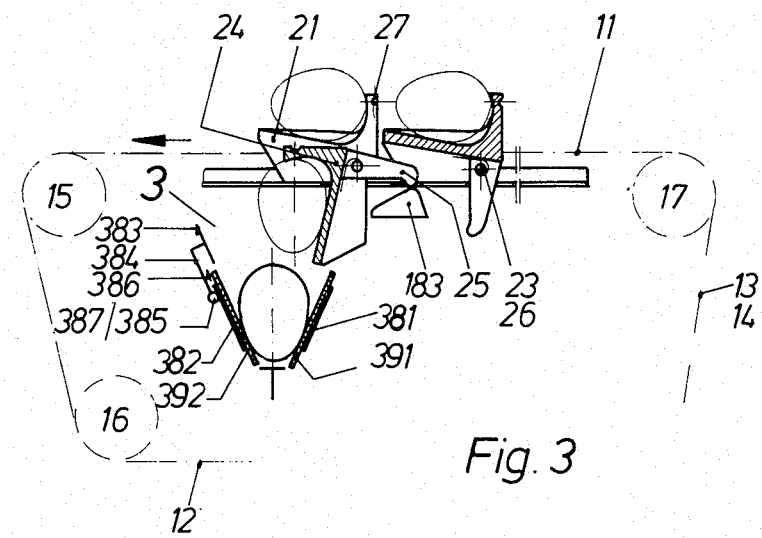
Fig. 3
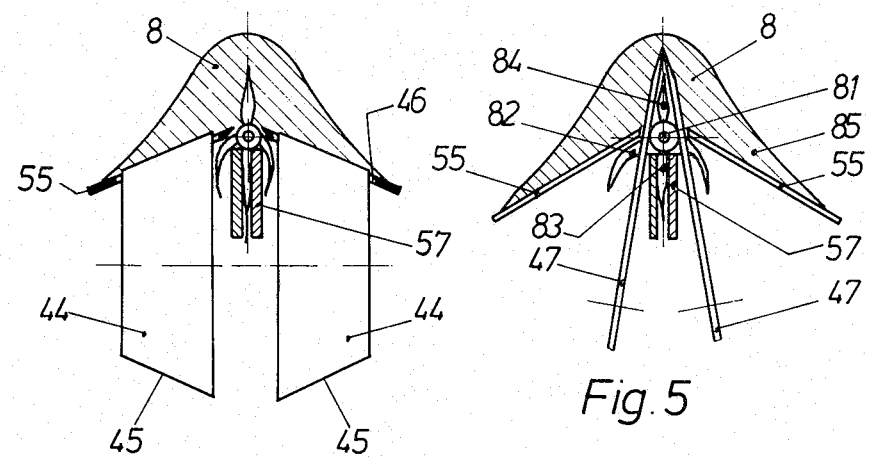
Fig. 4
Fig. 5

FISH PROCESSING MACHINE

BACKGROUND OF THE INVENTION

1. Field of Invention

The invention relates to a fish processing machine having an endless loading conveyor adapted to convey fish lying on their sides in fish troughs transversely to their longitudinal axis, a feed section having opposed walls forming a V-shape and adapted to advance the fish in the direction of their longitudinal axis, and a filleting section provided with belly filleting knives, rib knives and a pair of endless conveyors.

2. Description of Prior Art

Such machines are used to process mass fish having a predominantly flat eliptical or oval section across their plane of symmetry. They permit an uninterrupted operation with a high hourly output but are inadequate when the cross section of the fish becomes more nearly circular, particularly when the fish also has a soft consistency. In particular difficulties arise when the fish are delivered from the loading conveyor to the feed section, when the fish are conveyed from the feed section and when the fish are processed in the filleting section.

OBJECT OF INVENTION

The main object of the invention is to improve the known type of machine so that fish with a nearly circular cross section, such as mackerel, blue whiting or the like, may be reliably and satisfactorily processed even when they are soft.

SUMMARY OF THE INVENTION

According to the invention the feed section is positioned between the upper and lower runs of the loading conveyor, each fish trough has a tipping trough mounted so as to tilt about an axis substantially transverse to its direction of movement and adapted to deliver fish turned through 90° to the feed section, the tipping trough being associated with means to tilt it when it reaches the the feed section.

The advantages achieved reside in particular in the fact that the fish can be turned through exactly 90° from the position in which they were laid by hand in the fish troughs, without any danger of their turning or rolling, are brought into the feed section with the smallest possible drop, and are transferred from the feed section with their planes of symmetry all in the same orientation.

In order to enable the head and/or tail to be cut off and the body of the fish to be turned through 90° in a preferred manner each tipping trough may be pivotally mounted between a head trough and a slider element rigidly secured to the latter and the head trough and the slider element may each be secured to a respective endless chain and conveyed along the length of the upper run of the loading conveyor on a respective guide track.

According to another embodiment of the invention the opposed walls of the feed section forming a V comprise two parallel endless conveyor belts rotating in synchronism and passing around two drive rollers mounted about axes inclined towards one another at their upstream ends, and around two idler rollers mounted about substantially parallel axes at their downstream ends, the idler rollers being mounted so as to yield against the restoring force of a spring. This embodiment both enables and ensures the reliable reception and rapid transfer of the fish from the feed section in their fed-in position.

Advantageously the conveyor belts together with a pivot arm carrying their drive rollers and idler rollers may be arranged so as to yield about a horizontal axis situated near to the drive rollers against the restoring force of a spring. This permits the fish together with the conveyor belts of the feed section holding them to be set at the correct height for the filleting section, without the risk that the fish will turn or tilt about their longitudinal axes should there be a variation in heights between the conveyor belts.

In another preferred embodiment constructed in accordance with the invention the idler rollers are carried by a pair of rocking levers pivotally mounted about axes lying perpendicular to the pivot arm, the bosses of which rocking levers are connected to a back guide which is pivotally mounted about a horizontal spindle secured to the machine and which extends between the idler rollers said connection being such that a particular height of the end of the back guide corresponds to a predetermined clearance between the idler rollers. This structure allows the conveyor belts of the feed section together with any fish in the space between them automatically to be set to the correct height for the processing of the respective fish.

According to yet another embodiment according to the invention there is provided a fish processing machine having a filleting section with a pair of belly filleting knives, a pair of rib knives and a pair of bone knives wherein a grinding element for the inner walls of the belly cavity of the fish is mounted between the rib knives and the bone knives. Such a machine enables the belly cavity of such fish to be freed of the black skin inside the belly. In order to even improve this effect and to enable this inner belly skin to be removed from the fish which are conveyed with their head ends leading the grinding elements together with their grinding surfaces engaging the fish may rotate in the direction of travel of the fish but at a higher speed than the conveying speed of the fish.

In a further embodiment constructed in accordance with the invention a pair of rib guides inclined towards one another are arranged between the rib knives and the bone knives while a pair of vertebral guides are arranged below said rib guides. This enables fish with a nearly circular cross section to be guided merely by gripping their bone structure after the belly fillet cuts and back cuts have been made.

In order to enable the belly flaps to be reliably cut away, even from very soft fish the invention preferably provides for an embodiment in which a pair of belly flap knives lying in nearly parallel planes are arranged between the belly filleting knives and the rib knives.

BRIEF DESCRIPTION OF THE DRAWINGS

Other and further objects of the present invention will be apparent from the following description and claims and are illustrated in the accompanying drawings which by way of illustration show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings show:

FIG. 3 is a cut away cross sectional view of the feed section and a few loading troughs.

FIG. 4 is a cross sectional view of the filleting section in the region of the grinding elements.

FIG. 5 is a cross sectional view of the filleting section behind the rib knives.

DESCRIPTION OF THE PREFERRED EMBODIMENT

Figure 1:
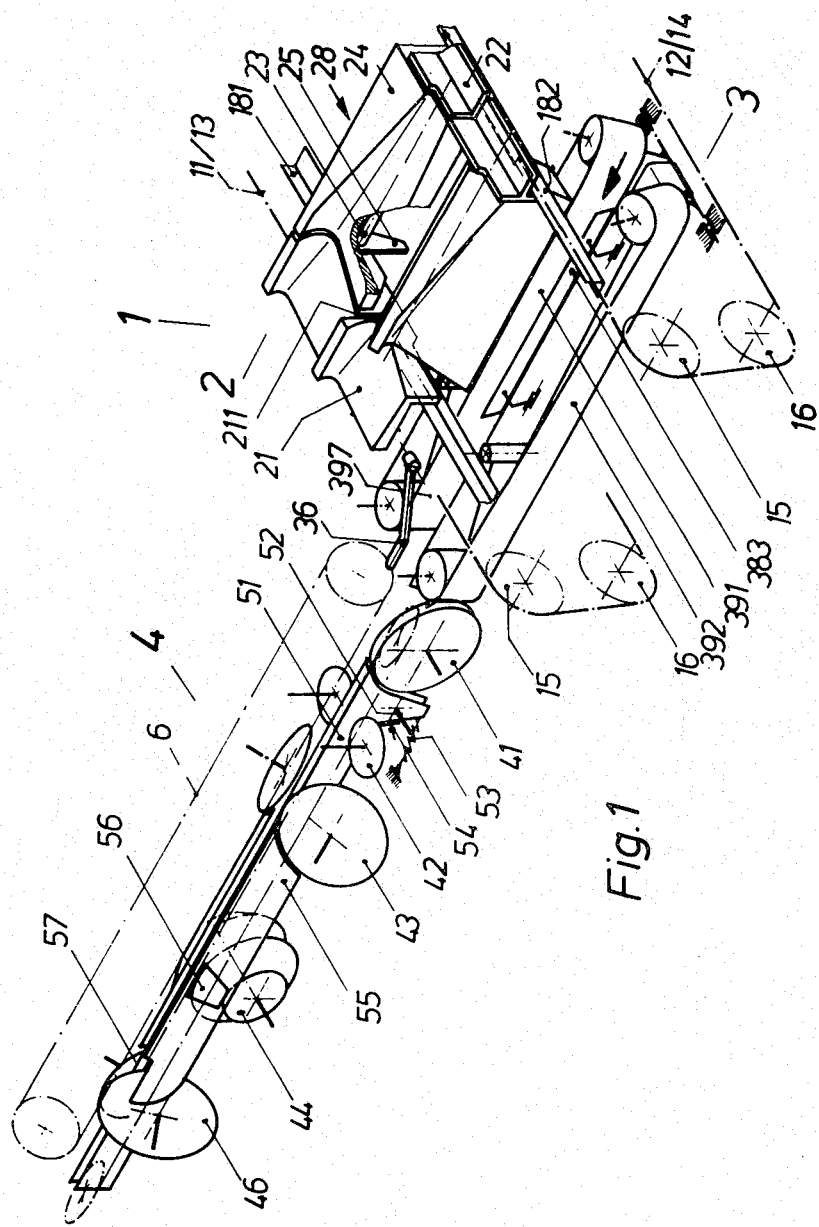
FIG. 1 is a cut away axonometric view of a fish processing machine constructed in accordance with the invention.

The fish processing machine shown in FIG. 1 without its frame, housing, and drive system comprises a loading conveyor 1, a feed-in section 3 and a filleting section 4. The loading conveyor 1 comprises two endless chains 13 and 14 engaging a pair of drive wheels 16, a pair of tensioning wheels 17 and/or at least one pair of idler wheels 15, fish troughs 2 carried by the chains and guide tracks or rails 181 and 182. Each fish trough 2 is built up from a head trough 21, a slider element 22, a pivot pin 23 rigidly connecting them together and a tipping trough 24 pivotally mounted on the pivot pin 23 between the head trough 21 and the slider element 22.

Each tipping trough 24 is provided with a downwardly projecting operating lever 25. L-shaped guide tracks 181 and 182 of metal or plastics material are provided in the upper run 11 of the loading conveyor parallel to the chains 13 and 14 so as to guide the fish troughs 2 in a straight path. Guide track 181 guides the head trough 21, and guide track 182 guides slider element 22.

The feed section 3 is arranged between the upper run 11 and the lower run 12 of the loading conveyor 1 in front of the idler rollers and has a transfer chute or channel 397 for receiving the fish. The transfer chute 397 is formed by two endless conveyor belts 391 and 392. Above the left hand conveyor belt 392 there is a tiltable guide plate 383, and a back guide 36 is arranged between the ends of the pair of belts.

The filleting section 4 extending in the extension of the transfer chute 397 comprises a guide path for the fish, a pair of endless conveyors 6 shown in chain dotted lines, and cutting tools. These comprise a pair of vertically mounted belly filleting knives 41, a pair of approximately horizontally mounted belly flap knives 42, a pair of rib knives 43 inclined towards one another, a pair of grinding elements 44 rotating about a horizontal axis, and a pair of bone knives 46. For guiding the fish a bone guide 51 is mounted behind the belly filleting knives 41 so as to be tiltable about a horizontal axis and is held against an abutment 54 by a spring 53. Rib guides 55 lying in the planes of the rib knives 43 extend behind the rib knives 43 as far as the bone knives 46 and are provided with window like apertures 56 in the region of the grinding elements. In addition vertebra guides 57 extend from the rib knives 43 to the bone knives 46.

Figure 2:
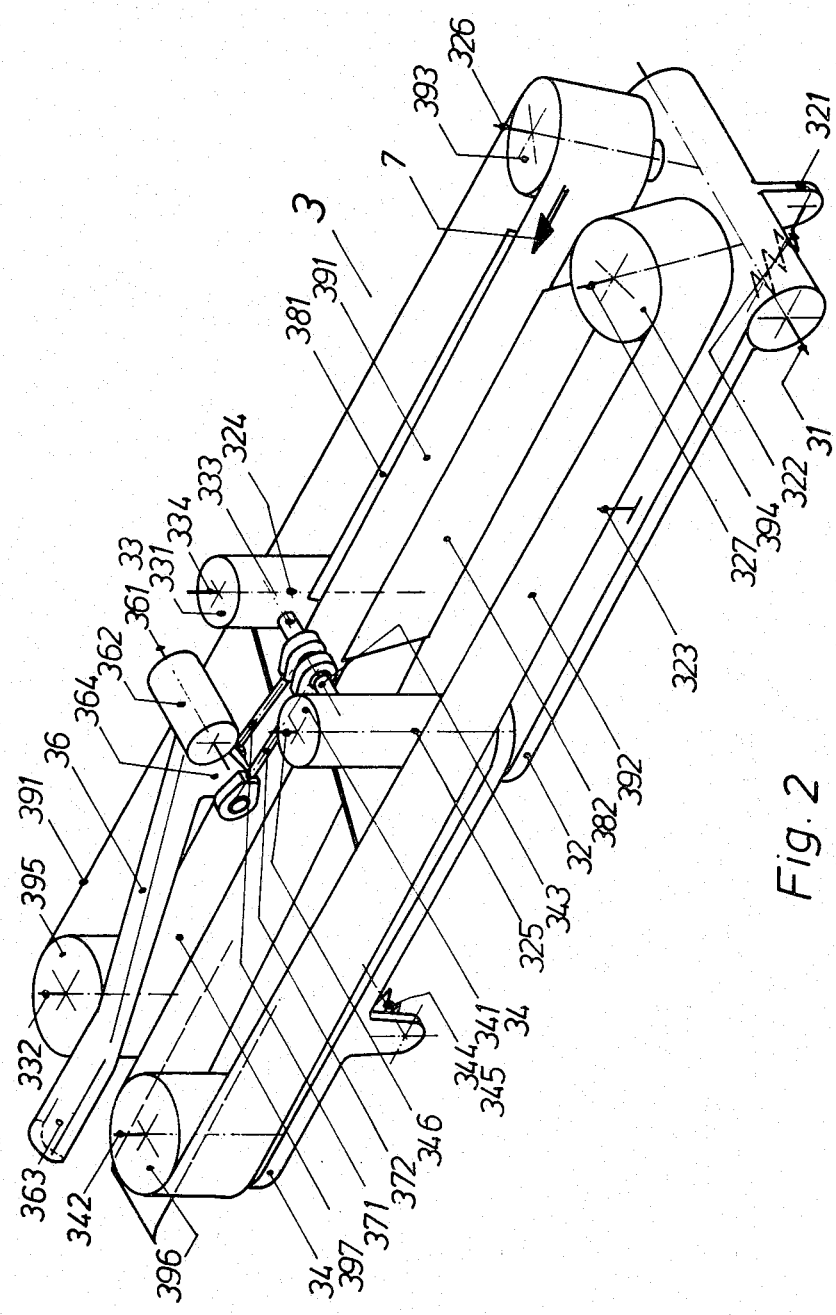
FIG. 2 is a cut away view of part of FIG. 1.

As shown in FIG. 2 the right hand ends of the conveyor belts 391 and 392 of the feed-in section 3 pass around two drive rollers 393 and 394 rotating about two axes 326 and 327 inclined towards one another, and the left hand ends pass around two idler rollers 395 and 396 rotating about nearly parallel axes 332 and 342. The conveyor belts 391 and 392, together with the transfer chute 397 formed by them, are constructed so as to yield downwardly against the force of a spring. For this purpose a pivot arm 32 carrying the axes 326 and 327 is mounted to pivot about a horizontal shaft at the right hand end of the conveyor belts 391 and 392, and is held in a raised position against a stop 323 secured to the machine by a spring 322 acting on projection 321. The pivot arm 32 has bores 324 and 325 at its left hand end in which vertically projecting pivot pins 334 and 346 are secured on which the bosses 331 and 341 respectively of rocking levers 33 and 34 are mounted. The rocking levers 33 and 34 are tensioned together by means of a spring 344 against an adjustable stop 345 thus rendering the gap or distance between the conveyor belts 391 and 392 adjustable. The rocking levers 33 and 34 carry the idler rollers 395 and 396 at their free ends and are provided with levers 333 and 343 at their bosses 331 and 341 respectively. On the left of the bosses 331 and 341 is situated a horizontal spindle 361 secured to the machine about which a back guide 36 is pivotally mounted, the end of which extends to a point in between the idler rollers 395 and 396. A lever 364 extending downwardly from a boss 362 of the spindle 361 is flexibly connected at its right hand side to the end of the lever 333 by a first jointed coupling rod 371 and at its left hand side to the end of the lever 343 by a second jointed coupling rod 372. Thus the two rocking levers 33 and 34 are coupled to each other so as to move synchronously and to the back guide 36 so that any particular vertical position of the end 363 of the back guide 36 corresponds to a predetermined respective distance between the idler rollers 395 and 396.

In FIG. 3 the upper run 11 and the lower run 12 of the chains 13 and 14, the drive wheels 16, the idler wheels 15 and the tensioning wheels 17 may be seen. Between these are situated the two conveyor belts 391 and 392 of the feed section 3; the right hand conveyor belt 391 being supported by a slide plate 381 and the left hand conveyor belt 392 by a slide plate 382. A tiltable guide plate 383 is pivoted on the left slide plate 382 about a pivot pin 385. This guide plate 383 is carried by brackets 384 and held in its position against a stop 386 by a helical spring 387. Of the tipping troughs 24 the one on the right is in the loading position and the one on the left in the delivery position. The latter is moved into the delivery position by engagement of its operating lever 25 against a cam 183 secured to the left hand guide track 181, while the former is held against the stop 27 by a restoring spring 26 wound around the pivot pin 23.

FIG. 4 shows a fish 8 with its belly cavity over the grinding elements 44, its backbone 81 being supported from above between the two rib guides 55 and from below by the two vertebra guides 57.

FIG. 5 shows a fish 8 with its belly cavity adjacent the bone knives 47 which have separated the ribs 82 from the back bone 81 while it is supported from above by the rib guides 55 and from below by the spine or vertebra guides 57.

The operation of the fish processing machine is as follows:

A fish is so laid into a loading trough 2 on the loading conveyor 1 that it lies in the tipping trough 24 on its right side and its head lies in the head trough 21. By the loading conveyor 1 it is conveyed under a head knife (not shown) which decapitates the fish by means of a cut between the head trough 21 and the tipping trough 24. The body of the fish without its head and if necessary without its tail fin is transferred to the feed section 3 in the tipping trough 24. Before reaching the feed section 3 the operating lever 25 of the tipping tray 24 engages the cam 183 which is secured to the machine as is shown in FIG. 2 thus causing the tipping trough 24 together with the body of the fish to tilt trough 90°. Thereupon the body of the fish 8 slides downwardly under the action of gravity between the conveyor belts 391 and 392 which are inclined to one another so as to form a V and which move in the direction of the arrow 7. Due to the fact that the upper edges of the conveyor belts 391 and 392 are arranged directly underneath the lower edge of the tilted tipping trough 24, the fish falls such a small way only that it does not turn about its longitudinal axis and may be conveyed to the left by the conveyor belts 391 and 392 with its plane of symmetry lying in the central plane of the transfer chute 397. When the fish, which moves with its head end forwards, leaves the region in which the conveyor belts 391 and 392 are supported by the slide plates 381 and 382 and reaches the idler rollers 395 and 396, the latter are forced apart by a distance equal to the breadth or thickness of the fish and thus set the back guide 36 at a height corresponding to the breadth of the fish. The back guide 36, which is held at this correct height, together with the conveyor belts 391 and 392 biasses the fish downwards so that the fish 8 is directed towards the belly filleting knives 42 with its backbone or vertebral column at the desired height and is engaged by the conveyors 6 in the correct position. When passing on by means of these conveyors the fillets on the belly side of the backbone vertebral column 81 are cut away from the belly spokes 83 by the belly filleting knives, the lowers strips of the belly flaps are cut away by the belly flap knives 42, and the ribs 82 are cut out of the fillets by the rib knives 43. The black skin situated on the inner sides of the belly flaps is peeled away by the grinding surfaces 45 of the grinding elements 44 which extend through the apertures 56 in the rib guides 55, and the fish is cut into a bone-free double fillet by the bone knives 46, which fillet may if required be separated into two individual fillets by a pair of back or separating knives mounted behind the bone knives.

What is claimed is:

1. Fish processing machine having an endless loading conveyor including a horizontal upper run and a horizontal lower run and adapted to convey fish along said horizontal upper run with said fish lying on their sides in fish troughs transversely to their longitudinal axis, a feed section having opposed walls forming a V-shape and adapted to advance the fish in the direction of their longitudinal axis and substantially perpendicular to the direction of feed of the upper run of said loading conveyor, and a filleting section provided with belly filleting knives, rib knives and a pair of endless conveyors, wherein the feed section is positioned between the upper and lower runs of the loading conveyor, each fish trough has a tipping trough pivotally mounted on said endless loading conveyor for tilting movement thereon about a pivotal axis substantially transverse to its direction of movement as said tipping trough moves along said upper horizontal run above said feed section, whereby to deliver fish turned through 90° to said feed section, and said machine includes actuating means for tilting each tipping trough about its pivotal axis as said tipping trough reaches a selected position along said upper horizontal run above said feed section.

2. Fish processing machine according to claim 1 wherein each tipping trough is pivotally mounted between a head trough and a slider element, said head trough and slider element being rigidly secured to each other and each being secured to a respective endless chain and conveyed along the length of the upper run of the loading conveyor on a respective guide track.

3. Fish processing machine according to claim 1 wherein the opposed walls of the feed section forming a V comprise two parallel endless conveyor belts rotating in synchronism and passing around two drive rollers mounted about axes inclined towards one another at their upstream ends, and around two idler rollers mounted about substantially parallel axes at their downstream ends, the idler rollers being mounted so as to yield against the restoring force of a spring.

4. Fish processing machine according to claim 3 wherein the drive rollers and idler rollers carrying said conveyor belts are mounted upon a pivot arm pivotally mounted about a transverse axis extending parallel to the lower horizontal run of said loading conveyor and located proximate to said drive rollers, said pivot arm being yieldable about said transverse axis against the restoring force of a spring.

5. Fish processing machine according to claim 4 wherein the idler rollers are carried by a pair of rocking levers pivotally mounted about axes lying perpendicular to said pivot arm, said rocking levers having bosses connected to a back guide which is pivotally mounted about a horizontal spindle secured to the machine and which extends between the idler rollers, said connection being such that a particular height of the end of the back guide corresponds to a predetermined clearance between the idler rollers.

6. Fish processing machine according to claim 1 having a filleting section with a pair of belly filleting knives, a pair of rib knives and a pair of bone knives wherein a grinding element for the inner walls of the belly cavity of the fish is mounted between the rib knives and the bone knives.

7. Fish processing machine according to claim 6 wherein the grinding elements together with their grinding surfaces engaging the fish rotate in the direction of travel of the fish but at a higher speed than the conveying speed of the fish.

8. Fish processing machine according to claim 6 wherein a pair of rib guides inclined towards one another are arranged between the rib knives and the bone knives while a pair of vertebral guides are arranged below said rib guides.

9. Fish processing machine according to claim 1 wherein a pair of belly flap knives lying substantially in the same plane are arranged between the belly filleting knives and the rib knives.

* * * * *